(12) United States Patent     (10) Patent No.:   US 12,662,234 B2

Sermeus       (45) Date of Patent:    Jun. 23, 2026

(54) SYSTEMS AND METHODS FOR CONTROLLING A VARIABLE CAMBER FLIGHT CONTROL SYSTEM OF AN AIRCRAFT IN A CRUISE FLIGHT PHASE

(71) Applicant: BOMBARDIER INC., Montreal (CA)

(72) Inventor: Kurt Sermeus, Salaberry de Valleyfield (CA)

(73) Assignee: BOMBARDIER INC., Dorval (CA)

( * ) Notice: Subject to any disclaimer, the term of this patent is extended or adjusted under 35 U.S.C. 154(b) by 103 days.

(21) Appl. No.: 18/406,999

(22) Filed: Jan. 8, 2024

(65) Prior Publication Data

US 2024/0228012 A1     Jul. 11, 2024

Related U.S. Application Data

(60) Provisional application No. 63/437,798, filed on Jan. 9, 2023.

(51) Int. Cl.
   *B64C 9/18*       (2006.01)
   *B64C 3/48*       (2006.01)

(52) U.S. Cl.
   CPC ..................................... *B64C 3/48* (2013.01)

(58) Field of Classification Search
   CPC .... B64C 3/48; B64C 9/18; B64C 9/16; B64C 9/20
   USPC .......................................................... 701/5
   See application file for complete search history.

(56) References Cited

U.S. PATENT DOCUMENTS

| | | | |
|---|---|---|---|
| 4,723,214 A | 2/1988 | Frei | |
| 7,207,526 B2 | 4/2007 | Mccarthy | |
| 7,357,358 B2 | 4/2008 | Lacy et al. | |
| 9,180,962 B2 | 11/2015 | Moser et al. | |
| 9,227,721 B1 * | 1/2016 | Nguyen | B64C 3/50 |
| 9,254,909 B2 | 2/2016 | Moser et al. | |
| 10,336,463 B2 | 7/2019 | Ribeiro et al. | |
| 11,059,569 B1 * | 7/2021 | Nguyen | B64C 3/50 |
| 11,242,134 B1 * | 2/2022 | Nguyen | B64F 5/60 |
| 2002/0005461 A1 * | 1/2002 | Nettle | B64C 3/48 |
| | | | 244/214 |

(Continued)

FOREIGN PATENT DOCUMENTS

| | | |
|---|---|---|
| EP | 2974955 B1 | 3/2020 |
| EP | 3670330 A1 | 6/2020 |
| WO | 2003082671 A1 | 10/2003 |

OTHER PUBLICATIONS

Nguyen et al., "Multi-Objective Flight Control for Ride Quality Improvement for Flexible Aircraft", AIAA Scitech 2020 Forum, Jan. 2020, pp. 1-24.

(Continued)

*Primary Examiner* — Mike Anderson

(74) *Attorney, Agent, or Firm* — BCF LLP

(57)          ABSTRACT

The disclosed systems and methods for controlling a variable camber (VC) flight control system of an aircraft in a cruise flight phase, comprising: i) in response to a first input from a user, operating the VC flight control system in a first mode, the first mode configured to operate the aircraft according to a passenger comfort goal, by maintaining a deck angle of the aircraft at a low and substantially constant value; and ii) in response to a second input from the user, operating the VC flight control system in a second mode, the second mode configured to operate the aircraft according to an efficiency goal.

11 Claims, 5 Drawing Sheets

(56)     References Cited

U.S. PATENT DOCUMENTS

2020/0262557  A1 *    8/2020   Dunn ...................... B64C 3/385
2020/0342692  A1 *   10/2020   Yoo ........................ G01C 21/26
2021/0188446  A1 *    6/2021   Christenson ........... B64D 13/04
2023/0122408  A1 *    4/2023   Grimald ................... G08G 5/76
                                                          701/528

OTHER PUBLICATIONS

Urnes et al., "A Mission-Adaptive Variable Camber Flap Control System to Optimize High Lift and Cruise Lift-to-Drag Ratios of Future N+3 Transport Aircraft", 51st AIAA Aerospace Sciences Meeting, Jan. 2013, pp. 1-24.
European Search Report with regard to European Patent Application No. 24151062.7 completed May 24, 2024.

* cited by examiner

300

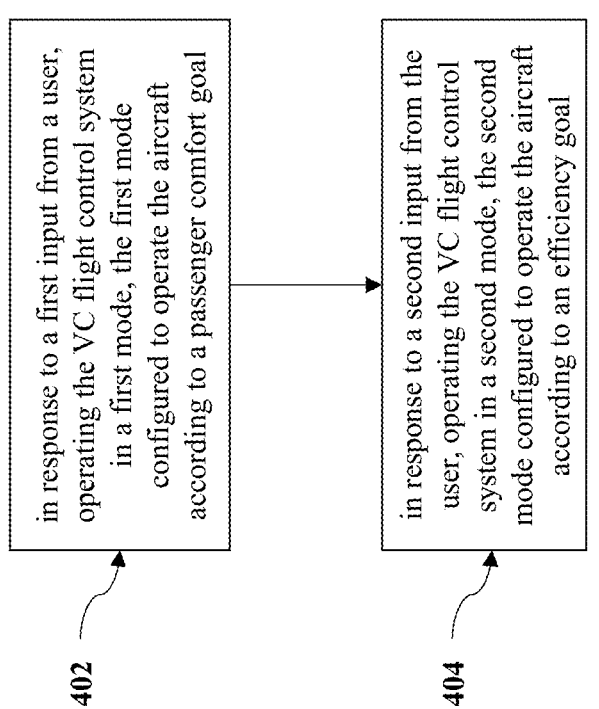

in response to a first input from a user, operating the VC flight control system in a first mode, the first mode configured to operate the aircraft according to a passenger comfort goal

402 in response to a second input from the user, operating the VC flight control system in a second mode, the second mode configured to operate the aircraft according to an efficiency goal

SYSTEMS AND METHODS FOR CONTROLLING A VARIABLE CAMBER FLIGHT CONTROL SYSTEM OF AN AIRCRAFT IN A CRUISE FLIGHT PHASE

CROSS-REFERENCE TO RELATED APPLICATIONS

The present application claims priority from U.S. Provisional Patent Application No. 63/437,798, filed on Jan. 9, 2023, the disclosure of which is incorporated by reference herein it is entirety.

TECHNICAL FIELD

The present disclosure generally relates to aircraft and, in particular, to systems and methods controlling a variable camber (VC) flight control system of an aircraft in a cruise flight phase.

BACKGROUND

One of the key design parameters for an aircraft is the aircraft deck angle, i.e., the pitch angle of the cabin floor of the aircraft to the horizontal. Particularly, during a cruise flight phase, selection of the aircraft deck angle plays a vital role. For a comfort of a passenger during the cruise flight phase, an aircraft deck angle close to zero is desirable. However, for aerodynamic efficiency (low cruise drag) a more positive aircraft angle of attack and associated deck angle is preferable. The more positive aircraft angle of attack and associated deck angle leads to having the fuselage generate some lift, so that the wings and horizontal tailplane of the aircraft are less burdened, which reduces drag (e.g., induced drag and trim drag).

These opposing requirements on the aircraft angle of attack and associated deck angle may lead to at least one of many compromises in aircraft design. To this end, there is an interest in developing methods and systems for controlling a variable camber (VC) flight control system of the aircraft in the cruise flight phase.

SUMMARY

The embodiments of the present disclosure have been developed based on developers' appreciation of the limitations associated with the prior art, namely opposing requirements on the aircraft angle of attack and associated deck angle may lead to at least one of many compromises in aircraft design.

Developers of the present technology have devised methods and systems for controlling a variable camber (VC) flight control system of the aircraft in the cruise flight phase.

BRIEF DESCRIPTION OF THE FIGURES

Further features and advantages of the present disclosure will become apparent from the following detailed description, taken in combination with the appended drawings, in which:

FIG. 4 illustrates a flowchart representing a process corresponding to a method for controlling the VC flight control system of the aircraft in a cruise flight phase, in accordance with various embodiments of the present disclosure.

Figure 1:
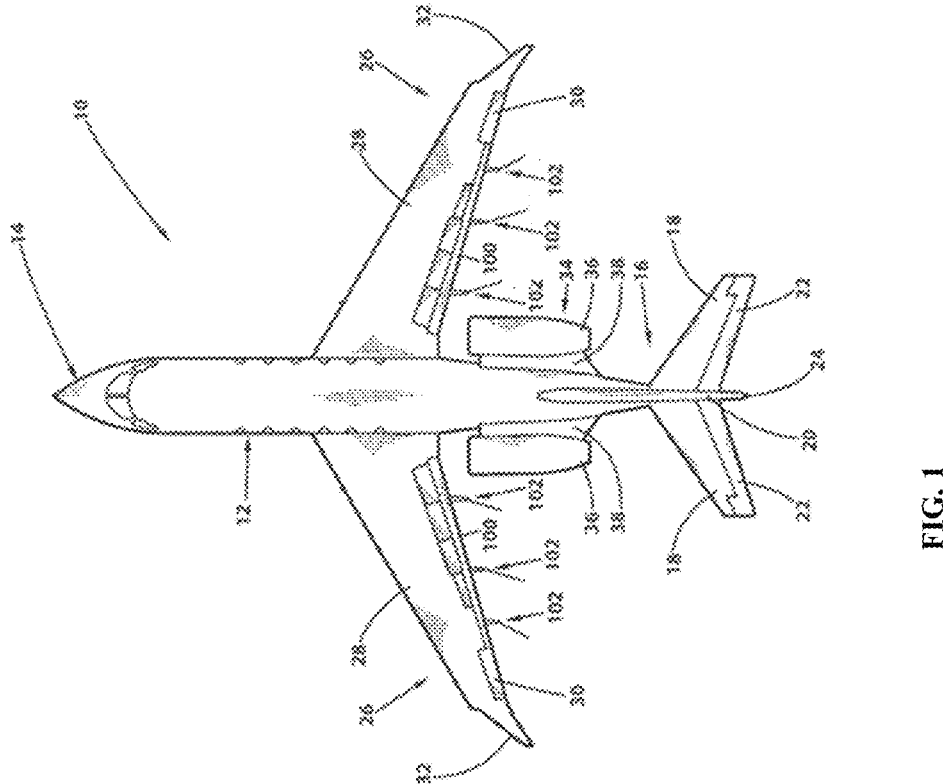
FIG. 1 illustrates a representative aircraft, in accordance with various non-limiting embodiments of the present disclosure.

It is to be understood that throughout the appended drawings and corresponding descriptions, like features are identified by like reference characters. Furthermore, it is also to be understood that the drawings and ensuing descriptions are intended for illustrative purposes only and that such disclosures do not provide a limitation on the scope of the claims.

DETAILED DESCRIPTION

The instant disclosure is directed to addressing at least some of the deficiencies of the current technology. In particular, the instant disclosure describes a system and a method for controlling a variable camber (VC) flight control system of an aircraft in a cruise flight phase.

As used herein, the term "about" or "approximately" refers to a +/-10% variation from the nominal value. It is to be understood that such a variation is always included in a given value provided herein, whether or not it is specifically referred to.

Unless otherwise defined or indicated by context, all technical and scientific terms used herein have the same meaning as commonly understood by one of ordinary skill in the art to which the described embodiments pertain.

In the context of the present specification, unless provided expressly otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first processor" and "third processor" is not intended to imply any particular order, type, chronology, hierarchy or ranking (for example) of/between the processors, nor is their use (by itself) intended to imply that any "second processor" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

It will be understood that when an element is referred to as being "connected" or "coupled" to another element, it can be directly or indirectly connected or coupled to the other element or intervening elements that may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In the context of the present specification, when an element is referred to as being "associated with" another element, in certain embodiments, the two elements can be directly or indirectly linked, related, connected, coupled, the second element employs the first element, or the like without limiting the scope of present disclosure.

The terminology used herein is only intended to describe particular representative embodiments and is not intended to be limiting of the present technology. As used herein, the singular forms "a," "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Embodiments of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified embodiments of the present technology. As persons skilled in the art would understand, various embodiments of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and embodiments of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" or a "processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general-purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, modules, or units which are implied to be software, may be represented herein as any combination of flowchart elements or other elements indicating performance of process steps and/or textual description. Such modules may be executed by hardware that is expressly or implicitly shown.

With these fundamentals in place, the instant disclosure is directed to address at least some of the deficiencies of the current technology. In particular, the instant disclosure describes a system and a method for controlling a variable camber (VC) flight control system of an aircraft in a cruise flight phase.

Generally, in an aircraft, deflection of flaps and ailerons may be controlled by a conventional variable camber (VC) flight control system. As such, the conventional VC flight control system may be configured to command the flaps and ailerons symmetrically during a cruise flight phase in order to optimize the lift distribution on the wings, chordwise and spanwise. Typically, the conventional VC flight control system is directed towards drag reduction and control of the wing spanload (center of lift position) for wing load alleviation, in particular gust loads. Such VC functionalities are automatic and depend on the flight conditions (e.g., speed, altitude, weight or the like). The VC logic may be implemented in the conventional VC flight control system in accordance with the flight control laws (CLAW).

The conventional VC flight control system is further configured to improve an aerodynamic efficiency of the aircraft. To do so, the conventional VC flight control system may command the flaps and ailerons to deflect in such a manner that the aircraft may fly with a more positive aircraft angle of attack and associated deck angle. The more positive aircraft angle of attack and associated deck angle leads to having the fuselage generate some lift, so that the wings and horizontal tailplane of the aircraft are less burdened, which reduces drag (e.g., induced drag and trim drag). At the same time, the more positive aircraft deck angle may discomfort the passenger during the cruise flight phase.

The opposing requirements on the aircraft angle of attack and associated deck angle may lead to a trade-off in one of many aircraft designs. To this end, there is an interest in developing methods and systems for controlling a variable camber (VC) flight control system of the aircraft in the cruise flight phase to address the above stated compromises.

Various techniques of the present disclosure are directed towards mitigating or at least reducing the aforementioned compromise. The VC flight control system of the present may be configured to maintain the aircraft at a higher maximum aircraft angle of attack and associated deck angle for aerodynamic efficiency and bring the aircraft deck angle to a lower value when desired for comfort during certain portions of the cruise flight phase.

FIG. 1 illustrates a representative aircraft 10, in accordance with various non-limiting embodiments of the present disclosure. The aircraft 10 may be a representative embodiment and other types of aircraft may be contemplated. As shown, the aircraft 10 may include a fuselage 12, a cockpit 14 and a tail 16 among other components.

The tail 16 may have left and right horizontal stabilizers 18 and a vertical stabilizer 20. Each horizontal stabilizer 18 may be provided with an elevator 22 used to control a pitch of the aircraft 10. The vertical stabilizer 20 may be provided with a rudder 24 used to control the yaw of the aircraft 10.

The aircraft 10 may also have a pair of wings 26. The left wing 26 may be connected to the fuselage 12 and extends on a left side thereof. The right wing 26 may be connected to the fuselage 12 and extends on a right side thereof. Each of the wings 26 may have a wing body 28, flap 100 and ailerons 30. The flaps 100 may be used to control the lift of the aircraft 10 and the ailerons 30 may be used to control the roll of the aircraft 10. It is contemplated that each wing 26 may have more than one flap 100. Each wing 26 may be provided with a winglet 32 at a tip thereof. It is contemplated that the winglets 32 may be omitted.

The wings 26 may include three flap actuation systems 102, and other components of a flap deployment system. It is contemplated that more or less than three flap actuation systems 102 may be provided depending on the size of the flap 100 and depending on the specific design of the flap actuation system 102.

In certain non-limiting embodiments, the flap 100 may be provided at a rear portion of the wing body 28. The flap actuation system 102 may connect the flap 100 to the wing body 28. The flap actuation system 102 may selectively move the flap 100 relative to the wing body 28 along a flap deployment path.

The aircraft 10 may include a left and right engine assemblies 34 connected to the left and right sides of the fuselage 12 respectively. As can be seen, the engine assemblies 34 may be longitudinally between the wings 26 and the horizontal stabilizers 18. It is contemplated that the engine assemblies 34 may be provided elsewhere on the aircraft 10, such as below the wings without limiting the scope of present disclosure. Each engine assembly 34 may have a nacelle 36 inside which is an engine (not shown). In the present embodiment, the engine may be a turbofan engine. It is contemplated that other types of engines may be used. A pylon 38 may be connected between the nacelle 36 and a corresponding side of the fuselage 12.

The aircraft 10 may be provided with many more components and systems, such as a landing gear and auxiliary power unit, which will not be described herein for the purpose of simplicity.

In certain non-limiting embodiments, the flaps 100 and the ailerons 30 may be configured have a variable camber. It is to be noted that the manner in which the flaps 100 and the ailerons 30 are cambered should not limit the scope of present disclosure.

Figure 2:
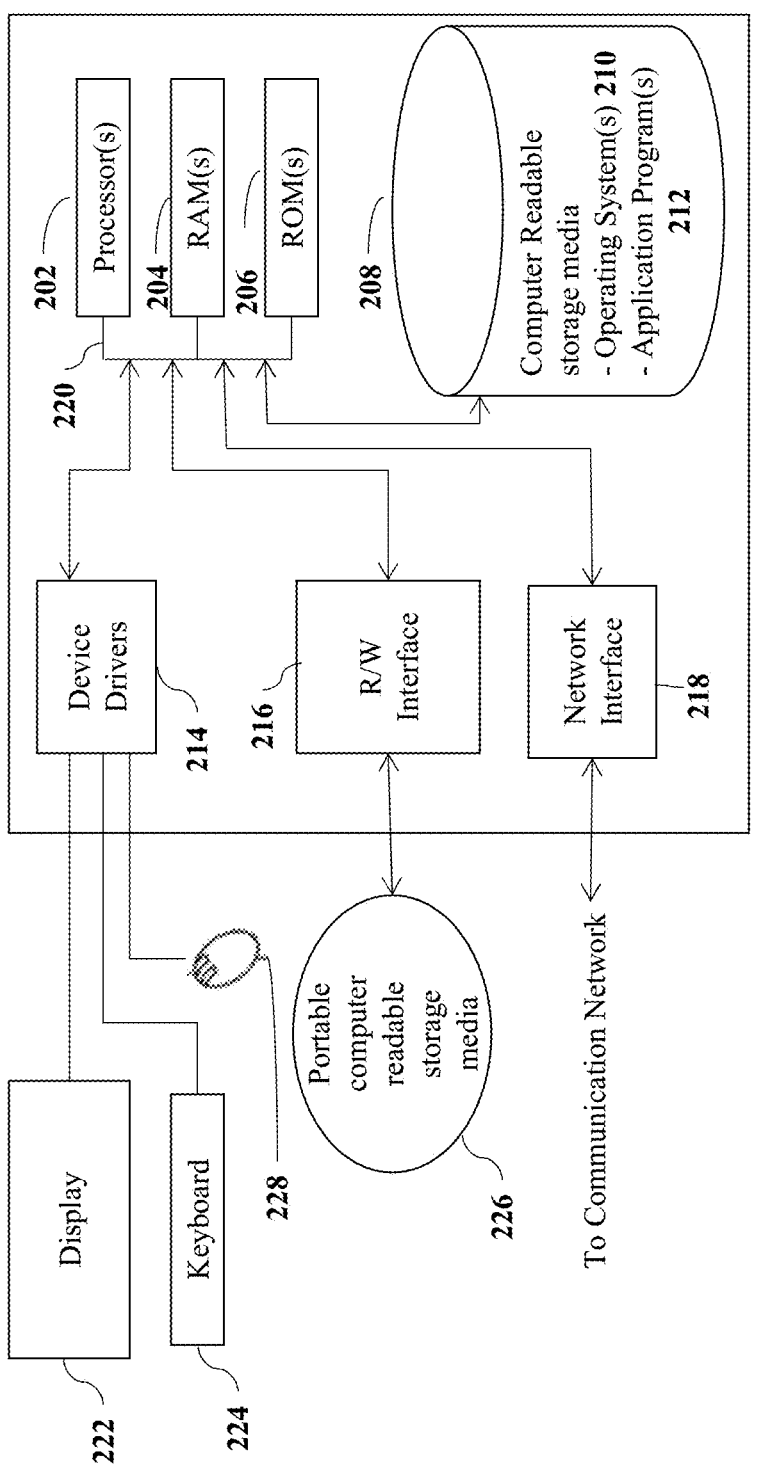
FIG. 2 depicts a high-level block diagram of components of a variable camber (VC) control system, in accordance with various embodiments of the present disclosure.

In certain non-limiting embodiments, the flaps 100 and the ailerons 30 may be controlled by a variable camber (VC) flight control system. FIG. 2 depicts a high-level block diagram of components of the VC flight control system 200, in accordance with various embodiments of the present disclosure. It should be appreciated that FIG. 2 provides only an illustration of one embodiment of the VC flight control system 200 and does not imply any limitations with regard to the environments in which different embodiments may be implemented. Various modifications to the depicted environment may be made to implement the VC flight control system 200 without departing from the principles presented herein. The VC flight control system 200 may be a server, a desktop computer, a laptop computer, or any device that may be configured to implement the present technology, as should be understood by a person skilled in the art.

As shown, the VC flight control system 200 employs one or more different types of processors 202, one or more computer-readable random access memories (RAMs) 204, one or more computer-readable read only memories (ROMs) 206, one or more computer-readable storage media 208, device drivers 214, a read/write (R/W) driver interface 216, and a network interface 218, all interconnected over a communication fabric 220. The communication fabric 220 may be implemented by any architecture designed for communicating data and/or control information between processors (such as microprocessors, communications and network processors, etc.), system memory, peripheral devices, and any other hardware components within a system.

The processor 202 of the VC flight control system 200 may include one or more of a CPU, an accelerator, a microprocessor, a GPU, an NPU, an ASIC, a FPGA, a dedicated logic circuitry, a dedicated artificial intelligence processor unit, or combinations thereof.

One or more operating systems 210 and one or more application programs 212 (examples of application programs may include programmed instructions) are stored on one or more of the computer-readable storage media 208 for execution by one or more of the processors 202 via one or more of respective RAMs 204 (which typically include a cache memory). In the illustrated embodiment, each of the computer-readable storage media 208 maybe embodied as a magnetic disc storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

The R/W driver interface 216 reads from and writes to one or more portable computer-readable storage media 226. The application programs 212 may be related to the intelligent heterogeneous computing system and stored on one or more of portable computer-readable storage media 226, read via the respective R/W driver interface 216 and loaded into the respective computer-readable storage media 208.

Further, network interface 218 may be based on a TCP/IP adapter card or wireless communication adapter (such as a wireless communication adapter using OFDMA technology). The application programs 212 on the VC flight control system 200 may be downloaded to the VC flight control system 200 from an external computer or external storage device via a communication network (for example, the Internet, a local area network or other wide area network or wireless network) and network interface 218. From network interface 218, application programs 212 may be loaded onto the computer-readable storage media 208. The VC flight control system 200 may connect to routers, firewalls, switches, gateway computers and/or edge servers of the communication network using copper wires, optical fibers, wireless transmission, and the like.

The VC flight control system 200 may also include one or more display screens 222, a keyboard or keypad 224, and a computer mouse or touchpad 228. The device drivers 214 may interface with the one or more display screens 222 for imaging, with the keyboard or the keypad 224, with a computer mouse or touchpad 228, and/or with the one or more display screens 222 (which may be a touch-sensitive display) for alphanumeric character entry and user selections. The device drivers 214, R/W driver interface 216 and network interface 218 may comprise hardware and software (stored on the computer-readable storage media 208 and/or the ROM 206).

Figure 3:
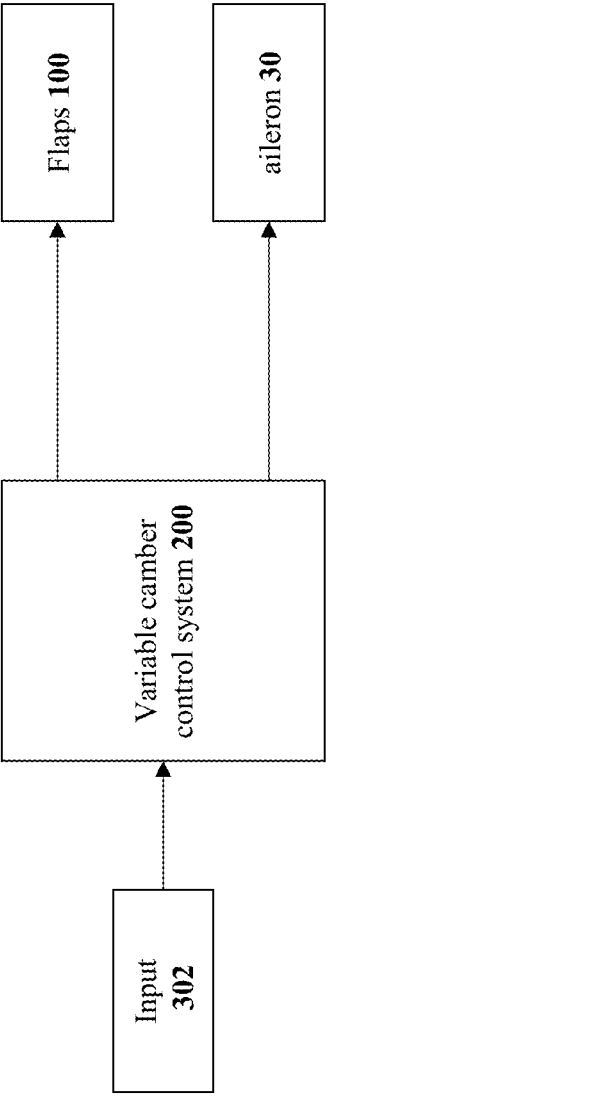
FIG. 3 illustrates a high-level functional block diagram of controlling the VC flight control system of the aircraft in a cruise flight phase, in accordance with various non-limiting embodiments of the present disclosure.

FIG. 3 illustrates a high-level functional block diagram 300 of controlling the VC flight control system 200 of the aircraft 10 in a cruise flight phase, in accordance with various non-limiting embodiments of the present disclosure. In certain non-limiting embodiments, the VC flight control system 200 may be located in the cockpit 14 and may be accessible by a pilot of the aircraft 10. In certain non-limiting embodiments, the VC flight control system 200 may be located in the fuselage 12 and may be accessible by a passenger in the aircraft. In certain non-limiting embodiments, at least a portion (e.g., display screen 222) of the VC flight control system 200 may be located in the fuselage 12 and the portion (e.g., display screen 222) of the VC flight control system 200 may be accessible by the passenger. The portion (e.g., display screen 222) may be communicatively coupled to the rest of the VC flight control system 200. It is to be noted that where the VC flight control system 200 is located should not limit the scope of the present disclosure.

The VC flight control system 200 may be configured to be operated under two modes during cruise flight phase. The first mode may be related to a passenger comfort goal and the second mode may be related an efficiency goal. The first mode may also be referred to as a comfort mode and the second mode may be referred to as economy (ECO) mode.

In certain non-limiting embodiments, the pilot may select a mode that may be fixed during an entire flight. In certain embodiments the pilot may make a selection between the first mode and the second mode at any time during the flight when the VC functionality of the flaps 100 and the ailerons 30 may be active and the aircraft 10 may be in the cruise flight phase. In certain non-limiting the passenger may make a selection between the first mode and the second mode at any time during the flight when the VC functionality of the flaps 100 and the ailerons 30 may be active and the aircraft 10 may be in the cruise flight phase.

In certain non-limiting embodiments, the mode in which the VC flight control system 200 is being operated may depend on an input from the pilot or the passenger. In certain non-limiting embodiments, during the cruise flight phase (i.e., a flight phase that occurs when the aircraft 10 levels after a climb to a set altitude and before it begins to descend), the VC flight control system 200 may provide an option to the pilot or the passenger to adjust the aircraft deck angle, i.e., the pitch angle of a cabin floor of the aircraft to the horizontal in accordance with the first mode or the second mode.

By way of an example, the option to select the mode may be displayed as a graphic user interface (GUI) on the display screen 222. The display screen 222 being a touch-sensitive display may facilitate an interaction of the pilot or the passenger with the display screen 222. In another example, the option to select the mode may be provided as a selection switch (not depicted). It is to be noted that how the mode is selected by the pilot or the passenger should not limit the scope of the present disclosure.

The input may be represented as input 302 (as shown in FIG. 3) may be a control signal generated based on the interaction of the pilot or the passenger with the display screen 222 or the selection switch. In certain non-limiting embodiments, the input 302 may act as a control signal for the VC flight control system 200 to operate under one of the two modes. The input 302 may be a first input related to the first mode or a second input related to the second mode.

In certain non-limiting embodiments, in response to the first input from the pilot or the passenger, the VC flight control 200 may be operated under the first mode. The first mode may be configured to operate the aircraft 10 according to the passenger comfort goal. The passenger comfort goal may be related to maintaining the aircraft deck angle at a low and substantially constant value.

In certain non-limiting embodiments, when the VC flight control system 200 is being operated under the first mode (the comfort mode), the VC flight control system 200 may command the flaps 100 and the ailerons 30 automatically to symmetrically droop, such that the flaps 100 and the ailerons 30 may maintain the aircraft angle of attack and associated deck angle at a low and substantially constant value. In certain non-limiting embodiments, in first mode the aircraft deck angle may be approximately equal to zero.

In certain non-limiting embodiments, deflection values required by the flaps 100 and the ailerons 30 to maintain the aircraft angle of attack and associated deck angle at a low and substantially constant value may be optimized offline. The deflection values may be referred to as angles with which the flap 100 and the ailerons 30 may be deflected to attain a certain aircraft angle of attack and associated deck angle. The manner in which the aircraft angle of attack and associated deck angle is optimized should not limit the scope present disclosure. By way of example, the deflection values may be optimized using computational fluid data (CFD), wind tunnel data or the like. In certain non-limiting embodiments, the deflection values may be predefined and stored in a look-up table. The VC flight control system 200 may use the predefined deflection values to maintain the aircraft deck angle close to zero in first mode. It is to be noted that deflection values may comply with the CLAWS.

In certain non-limiting embodiments, in response to the second input from the pilot or the passenger, the VC flight control 200 may be operated under the second mode. The second mode may be configured to operate the aircraft 10 according to the efficiency goal. The efficiency goal may be related to drag reduction and may be achieved by maintaining the aircraft angle of attack and associated deck angle at a relatively higher value as compared to the aircraft angle of attack and associated deck angle in the first mode. In certain non-limiting embodiments, the aircraft angle of attack and associated deck angle may be computed by the VC flight control system 200, such that the aircraft deck angle may reduce the drag felt by the aircraft 10. In certain non-limiting embodiments, the aircraft deck angle in the second mode may be a maximum allowable deck angle. In certain non-limiting embodiments, the maximum allowable deck angle may be approximately equal to 3°.

In certain non-limiting embodiments, when the VC flight control system 200 is being operated under the second mode (the ECO mode), the VC flight control system 200 may automatically command the flaps 100 and the ailerons 30 to deflect down for high lift coefficient. Also, the VC flight control system 200 may automatically command the flaps 100 and the ailerons 30 to deflect up for low lift coefficient. The flaps 100 and the ailerons 30 may deflect up to 2°-4° in either direction.

The VC drag reduction functionality of the flaps 100 and the ailerons 30 generally tends to make the aircraft 10 fly at a higher and typically almost constant aircraft deck angle. Instead of the aircraft deck angle gradually reducing while the aircraft 10 gets lighter (at a fixed altitude and speed), it may be the flaps 100 and the ailerons 30 that gradually move from trailing edge down to trailing edge up as the 'demand' on lift generation reduces. It is to be noted that that VC functionality of the flaps 100 and the ailerons 30 may make the aircraft 10 fly more often close to the maximum aircraft deck angle (e.g., around 3°), than would be the case for the aircraft 10 without VC functionality of the flaps 100 and the ailerons 30. The aircraft 10 flying close to the maximum aircraft deck angle during the cruise flight phase may be less comfortable to the passenger, however, the aircraft 10 may be more efficient, for example, in terms of fuel consumption.

Operating the aircraft 10 in accordance with the passenger comfort goal (i.e., operating the VC flight control system 200 in the first mode) may have some drag penalty (resulting in a higher fuel burning) as compared to operating the aircraft 10 in accordance with the efficiency goal (i.e., operating the VC flight control system 200 in the second mode). The deflection values for the flaps 100 and the ailerons 30 in the second mode may be optimized for minimum drag.

In order to maintain a balance between the first mode and a second mode, a maximum duration for which the VC flight control system 200 is operated in the first mode may be predefined and to some extent be time-limited to not adversely affect the long-range performance of the aircraft 10. In so doing, the associated drag penalty may be accounted in the fuel planning.

In order to minimize the excess block fuel that may be required to be carried and planned for, in certain non-limiting embodiments, the duration for which the VC flight control system may be operated in the first mode may be pre-programed by the pilot at the start of a flight of the aircraft 10. In certain non-limiting embodiments, the duration may define a comfort credit that may be displayed to the passenger and/or to the pilot on the display screen 222 (e.g., 90 minutes of Comfort Mode remaining). In certain non-limiting embodiments, information regarding the extra fuel may be displayed on the display screen 222.

It is to be noted that the extra fuel consumption by the aircraft 10 during the first mode may not be constant. To this end, in certain non-limiting embodiments, the maximum duration and/or the time-remaining of the first mode may be adjusted depending on the fuel consumption by the aircraft 10 during the flight duration. The adjusted time may be displayed on the display screen 222 (e.g., 50 minutes at start of the cruise flight phase versus 80 minutes at the end of the cruise flight phase).

To further protect the VC flight control system 200 from being misused by rapidly toggling between the first mode and the second mode, in certain non-limiting embodiments, the VC flight control system 200 may be switched from the first mode to the second mode only after a first predetermined duration (e.g., after 15 minutes). In a similar manner, the VC flight control system 200 may be switched from the second mode to the first mode only after a second predetermined duration (e.g., after 25 minutes).

FIG. 4 illustrates a flowchart representing a process 400 corresponding to a method for controlling the VC flight control system 200 of the aircraft 10 in a cruise flight phase, in accordance with various embodiments of the present disclosure. As shown, the process 400 commences at step 402 where in response to a first input from a user, the VC flight control system 200 operates in a first mode, the first mode configured to operate the aircraft 10 according to a passenger comfort goal, by maintaining a deck angle of the aircraft at a low and substantially constant value.

As previously noted, the flaps 100 and the ailerons 30 of the aircraft may be controlled by the VC flight control system 200. In addition to controlling the flaps 100 and the ailerons 30, the VC flight control system 200 may facilitate the pilot and/or the passenger to control the functionality of the VC control system 200 while the aircraft 10 may be in the cruise flight phase. The VC control system 200 may be operated two modes, the first mode associated with the passenger comfort goal and the second mode associated with the efficiency goal. Referring to FIG. 3, the pilot and/or the passenger may provide the input 302 to the VC control system 200 in any suitable manner as previously discussed. In response, to the first input, the VC control system 200 may be operated in the first mode by operating the aircraft 10 according to the passenger comfort goal. During the first mode, the aircraft deck angle at with the aircraft 10 is flying may be maintained at a low and substantially constant value.

Returning to FIG. 4, the process 400 proceeds to step 402 where in response to a second input from the user, the VC flight control system 200 operates in a second mode, the second mode configured to operate the aircraft 10 according to an efficiency goal.

It is contemplated that the aircraft 10 while being operated in first mode may consume more fuel. To this end, in various non-limiting, the VC flight control system 200 may be operated in the second mode. The second mode may be associated with the efficiency goal. As previously noted, the efficiency goal may be related to drag reduction and may be achieved by maintaining the aircraft deck angle at a relatively higher value as compared to the aircraft deck angle in the first mode.

Figure 5:
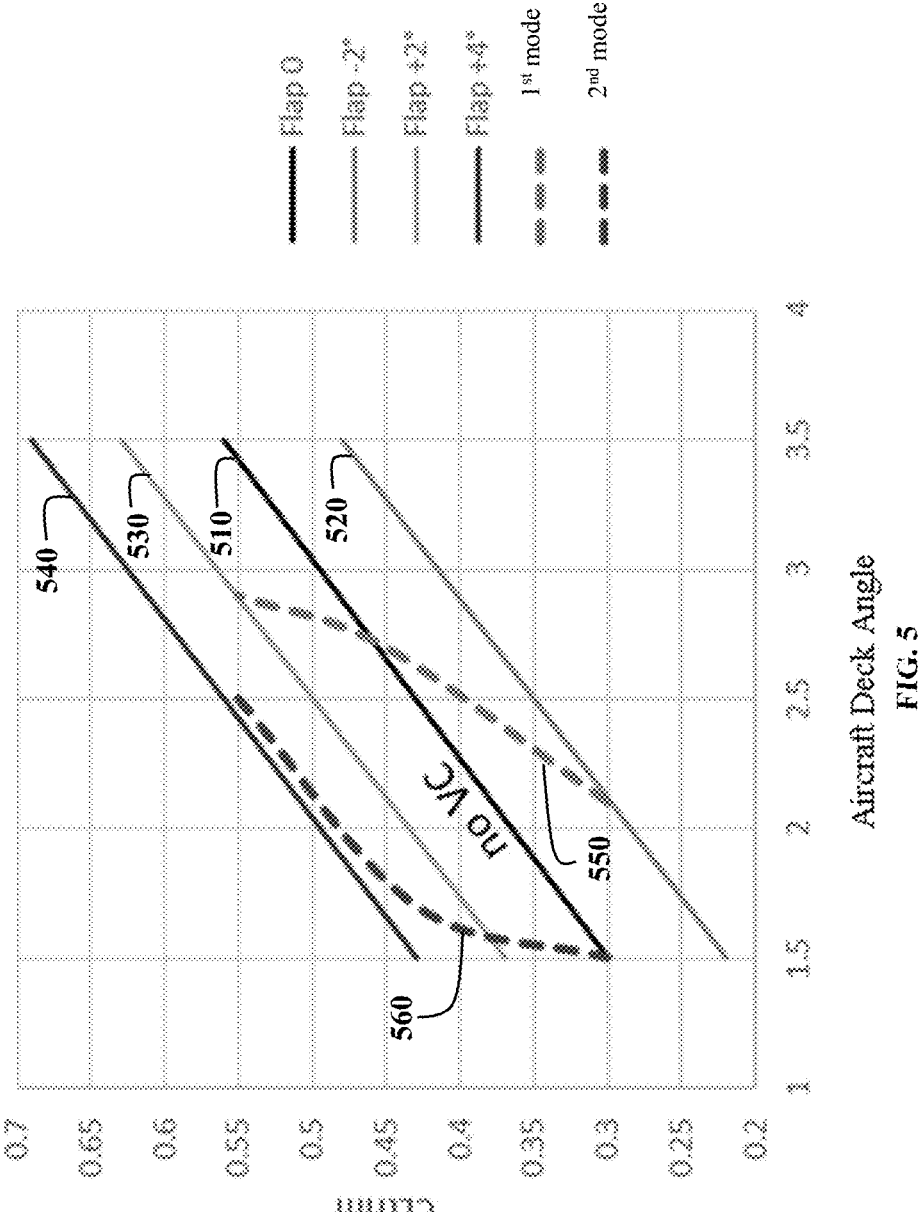
FIG. 5 illustrates a representative example of the lift curve (CLtrim) versus the aircraft deck angle, for different VC flap/aileron deflections at typical cruise condition and based on typical estimates of VC flap effectiveness, in accordance with various non-limiting embodiments of the present disclosure.

FIG. 5 illustrates a representative example 500 of the lift curve (CLtrim) versus the aircraft deck angle, for different VC flap/aileron deflection values at typical cruise condition (e.g., Mach 0.85) and based on typical estimates of VC flap effectiveness, in accordance with various non-limiting embodiments of the present disclosure. The solid lines in the representative example 500 are the lift curve for a fixed configuration (i.e., for the fixed deflection values of the flaps 100 and the ailerons 30). The dashed lines in the representative example 500 illustrate typical variation of VC flap/aileron angle and the aircraft deck angle (during cruise flight phase) as a function of CLtrim variation (0.55 to 0.3) during the cruise flight phase. In more details, curve 510 corresponds to Flap 0, curve 520 corresponds to Flap −2°, curve 530 corresponds to Flap +2°, curve 540 corresponds to Flap +4°, curve 550 corresponds to $1^{st}$ mode, and curve 560 corresponds to $2^{nd}$ mode. Using VC comfort mode (i.e., the first mode) it may be possible to lower the aircraft deck angle by approximately 0.5° to 1° while staying within a typical range of VC flap deflections of up to 4° trailing edge down, thereby offering a comfortable experience to the passenger during VC comfort mode.

It is to be understood that the operations and functionality of the VC flight control system 200, constituent components, and associated processes may be achieved by any one or more of hardware-based, software-based, and firmware-based elements. Such operational alternatives do not, in any way, limit the scope of the present disclosure.

It will also be understood that, although the embodiments presented herein have been described with reference to specific features and structures, it is clear that various modifications and combinations may be made without departing from such disclosures. The specification and drawings are, accordingly, to be regarded simply as an illustration of the discussed embodiments and their principles as defined by the appended claims, and are contemplated to cover any and all modifications, variations, combinations or equivalents that fall within the scope of the present disclosure.

What is claimed is:

1. A method for controlling a variable camber (VC) flight control system of an aircraft in a cruise flight phase, comprising:

in response to a first input from a user, operating the VC flight control system in a first mode, the first mode configured to operate the aircraft according to a passenger comfort goal, by maintaining a deck angle of the aircraft at a low and substantially constant value; and in response to a second input from the user, operating the VC flight control system in a second mode, the second mode configured to operate the aircraft according to an efficiency goal, wherein the user is a passenger of the aircraft and the VC flight control system is accessible by the passenger through a display screen in a fuselage, and wherein a maximum remaining duration of the first mode adjusted depending on a fuel consumption of the aircraft is displayed to the passenger.

2. The method of claim 1, wherein in the first mode, the deck angle is selected by the VC flight control system based on predefined deflection values of flaps and ailerons associated with the aircraft.

3. The method of claim 2, wherein the predefined deflection values are stored in a look-up table.

4. The method of claim 1, wherein the low and substantially constant value of the deck angle is approximately equal to zero.

5. The method of claim 1, wherein in the second mode, an angle of attack is computed by the VC flight control system, such that the angle of attack reduces a drag felt by the aircraft, said deck angle being dependent on the angle of attack.

6. The method of claim 1, wherein the deck angle in the second mode is a maximum allowable deck angle.

7. The method of claim 6, wherein the maximum allowable deck angle is approximately 3°.

8. The method of claim 1, wherein the VC flight control system is switchable from the first mode to the second mode only after a predetermined duration.

9. The method of claim 1, wherein the VC flight control system is switchable from the second mode to the first mode only after a predetermined duration.

10. A computer-implemented system configured to perform the method of claim 1.

11. A non-transitory computer-readable medium comprising computer-executable instructions that cause a system to execute the method according to claim 1.

* * * * *